United States Patent
Giubilo et al.

(10) Patent No.: US 11,640,480 B2
(45) Date of Patent: May 2, 2023

(54) DATA MESSAGE SHARING

(71) Applicant: BRITISH TELECOMMUNICATIONS PUBLIC LIMITED COMPANY, London (GB)

(72) Inventors: Fabio Giubilo, London (GB); Fadi El-Moussa, London (GB); Mark Shackleton, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 15/733,777

(22) PCT Filed: Mar. 19, 2019

(86) PCT No.: PCT/EP2019/056886
§ 371 (c)(1),
(2) Date: Oct. 23, 2020

(87) PCT Pub. No.: WO2019/206524
PCT Pub. Date: Oct. 31, 2019

(65) Prior Publication Data
US 2021/0248266 A1    Aug. 12, 2021

(30) Foreign Application Priority Data
Apr. 25, 2018  (EP) .................................. 18169177

(51) Int. Cl.
*G06F 21/00*  (2013.01)
*G06F 21/62*  (2013.01)
(Continued)

(52) U.S. Cl.
CPC ........ *G06F 21/6254* (2013.01); *G06F 21/602* (2013.01); *G06F 21/604* (2013.01); *G06F 21/64* (2013.01)

(58) Field of Classification Search
CPC ................. G06F 21/602; G06F 21/604; G06F 21/6254; G06F 21/64
See application file for complete search history.

(56) References Cited

U.S. PATENT DOCUMENTS

| | | |
|---|---|---|
| 8,214,584 B2 | 7/2012 | Johnson |
| 8,572,410 B1 | 10/2013 | Tkacik et al. |
| 9,141,303 B2 | 9/2015 | Kishi et al. |
| 9,189,609 B1 | 11/2015 | Antony |
| 9,608,810 B1 | 3/2017 | Ghetti et al. |

(Continued)

FOREIGN PATENT DOCUMENTS

| | | |
|---|---|---|
| CA | 2991785 A1 | 2/2017 |
| EP | 2645618 A1 | 10/2013 |

(Continued)

OTHER PUBLICATIONS

"Cloud Discovery Data Anonymization," Anonymize user data in Cloud App Security, Microsoft Docs, Apr. 20, 2020, Retrieved From the Internet: https://docs.microsoft.com/en-us/cloud-app-security/cloud-discovery-anonymizer , 8 pages.

(Continued)

*Primary Examiner* — Ghazal B Shehni
(74) *Attorney, Agent, or Firm* — Patterson Thuente, P.A.

(57) ABSTRACT

A computer implemented method of sharing a data message containing multiple data fields between a provider computer system and a consumer computer system, wherein the provider and consumer computer systems have mutual mistrust, is disclosed.

7 Claims, 5 Drawing Sheets

(51) Int. Cl.
*G06F 21/60* (2013.01)
*G06F 21/64* (2013.01)

(56) References Cited

U.S. PATENT DOCUMENTS

| | | | |
|---|---|---|---|
| 10,038,557 B2 | 7/2018 | Dimitrakos et al. | |
| 10,091,183 B2 | 10/2018 | Stumpf et al. | |
| 10,341,118 B2 | 7/2019 | Yang et al. | |
| 10,389,709 B2 | 8/2019 | Potlapally et al. | |
| 10,420,879 B2 | 9/2019 | Heck et al. | |
| 10,505,721 B2 | 12/2019 | Dimitrakos et al. | |
| 10,541,811 B2 | 1/2020 | Peddada et al. | |
| 10,607,018 B2 | 3/2020 | Amidi | |
| 10,972,263 B2 | 4/2021 | Gryb et al. | |
| 11,025,429 B2 | 6/2021 | Enke et al. | |
| 2004/0039925 A1 | 2/2004 | McMillan et al. | |
| 2005/0235143 A1 | 10/2005 | Kelly | |
| 2008/0022385 A1 | 1/2008 | Crowell et al. | |
| 2008/0263372 A1 | 10/2008 | Sako et al. | |
| 2009/0222631 A1 | 9/2009 | Sugiura | |
| 2009/0323967 A1 | 12/2009 | Peirce et al. | |
| 2011/0231671 A1 | 9/2011 | Locker et al. | |
| 2011/0271073 A1 | 11/2011 | Ikeda et al. | |
| 2011/0296197 A1 | 12/2011 | Konetski et al. | |
| 2012/0036370 A1 | 2/2012 | Lim et al. | |
| 2012/0117381 A1 | 5/2012 | Lo et al. | |
| 2012/0297189 A1 | 11/2012 | Hayton et al. | |
| 2013/0097421 A1 | 4/2013 | Lim | |
| 2013/0191648 A1 | 7/2013 | Bursell | |
| 2013/0243197 A1 | 9/2013 | Sherwood et al. | |
| 2014/0012916 A1* | 1/2014 | van Ham | H04L 51/48 |
| | | | 709/204 |
| 2014/0149666 A1 | 5/2014 | Nakagawa et al. | |
| 2014/0208111 A1 | 7/2014 | Brandwine et al. | |
| 2014/0282539 A1 | 9/2014 | Sonnek | |
| 2014/0380035 A1 | 12/2014 | Marinelli et al. | |
| 2015/0222606 A1* | 8/2015 | Yan | H04L 9/0847 |
| | | | 713/171 |
| 2015/0312759 A1* | 10/2015 | Kim | H04W 4/02 |
| | | | 455/411 |
| 2016/0261408 A1 | 9/2016 | Peddada et al. | |
| 2016/0342394 A1 | 11/2016 | Tsirkin | |
| 2016/0344724 A1* | 11/2016 | Shoshan | H04L 63/0428 |
| 2016/0352516 A1 | 12/2016 | Oberheide et al. | |
| 2017/0048061 A1 | 2/2017 | Bohdan et al. | |
| 2017/0052907 A1 | 2/2017 | Price, Jr. et al. | |
| 2017/0063853 A1* | 3/2017 | Lim | H04L 9/3242 |
| 2017/0286695 A1 | 10/2017 | Shetty et al. | |
| 2017/0286696 A1 | 10/2017 | Shetty et al. | |
| 2017/0286698 A1 | 10/2017 | Shetty et al. | |
| 2017/0288863 A1 | 10/2017 | Dimitrakos et al. | |
| 2017/0288871 A1 | 10/2017 | Dimitrakos et al. | |
| 2018/0323967 A1 | 11/2018 | Courtney | |
| 2018/0332011 A1 | 11/2018 | Gray | |
| 2019/0034218 A1 | 1/2019 | El-Moussa et al. | |
| 2019/0034645 A1 | 1/2019 | El-Moussa et al. | |
| 2019/0050247 A1 | 2/2019 | El-Moussa et al. | |
| 2019/0052613 A1* | 2/2019 | Karlsen | H04L 9/3073 |
| 2021/0203495 A1 | 7/2021 | Daniel et al. | |
| 2021/0218564 A1 | 7/2021 | Daniel et al. | |

FOREIGN PATENT DOCUMENTS

| | | |
|---|---|---|
| GB | 2472491 A | 2/2011 |
| JP | 2015061267 A | 3/2015 |
| WO | WO-2008141167 A2 | 11/2008 |
| WO | WO-2013091221 A1 | 6/2013 |
| WO | WO-2017116260 A1 | 7/2017 |
| WO | WO-2017129657 A1 | 8/2017 |

OTHER PUBLICATIONS

Extended Search Report for European Application No. EP18169177. 5, dated Oct. 9, 2018, 10 pages.
GB Combined Search and Examination Report for GB Application No. GB1806724.9 dated Nov. 13, 2018, 10 pages.
International Search Report and Written Opinion for Application No. PCT/EP2019/056886, dated Apr. 9, 2019, 12 pages.
Neuman B.C., et al., "Kerberos: An Authentication Service for Computer Networks," ISI Research Report, ISI/RS-94-399, Sep. 1994, 8 pages.
Bragg R., "The Encrypting File System," How EFS Works, Jun. 29, 2009, retrieved from: https://technet.microsoft.com/enus/library/cc700811.aspx#mainSection on Jul. 26, 2018, 14 pages.
Bremer J., "Intercepting System Calls on x86_64 Windows," May 15, 2012, Development & Security, retrieved from: http://jbremer.org/intercepting-system-calls-onx8664-windows/ on Jul. 26, 2018, pp. 1-9.
Extended European Search for EP Application No. 18174203.2, dated Jul. 5, 2018, 10 pages.
GB Combined Search and Examination Report for GB Application No. GB1808602.5 dated Nov. 26, 2018, 5 pages.
GB Combined Search and Examination Report for GB Application No. GB1808601.7 dated Nov. 26, 2018, 5 pages.
Hunt G., et al., "Detours: Binary Interception of Win32 Functions," Proceedings ofthe 3rd USENIX Windows NT Symposium, Jul. 1999, retrieved from: http://research.microsoft.com/sn/detours, pp. 1-9.
International Preliminary Report on Patentability for Application No. PCT/EP2015/071773, dated Apr. 6, 2017, 7 pages.
International Preliminary Report on Patentability for Application No. PCT/EP2015/072000, dated Apr. 6, 2017, 9 pages.
International Search Report and Written Opinion for Application No. PCT/EP2015/071773, dated Oct. 26, 2015, 8 pages.
International Search Report and Written Opinion for PCT Application No. PCT/EP2019/061237 dated May 27, 2019, 15 pages.
International Search Report and Written Opinion for Application No. PCT/EP2015/072000, dated Nov. 4, 2015, 10 pages.
International Search Report and Written Opinion for PCT Application No. PCT/EP2017/051339 dated Mar. 31, 2017, 10 pages.
International Search Report and Written Opinion for PCT Application No. PCT/EP2017/051610 dated Mar. 31, 2017, 8 pages.
International Search Report and Written Opinion for PCT Application No. PCT/EP2017/051613 dated Apr. 20, 2017, 10 pages.
International Search Report and Written Opinion for PCT Application No. PCT/EP2017/051614 dated Mar. 31, 2017, 8 pages.
International Search Report and Written Opinion for PCT Application No. PCT/EP2019/061236 dated Jun. 3, 2019, 17 pages.
Kim S.W., "Intercepting System API Calls," Intel® Software, Mar. 7, 2012, 13 pages.
"Luna HSM", anonymous, XP055488416, Aug. 10, 2013, retrieved from http://www.cc.com.pl/pl/prods/safenet/pdf/SafeNet_Product_Brief_Luna_SA.pdf, 2 pages.
Muller T, et al., "TreVisor: OS-Independent Software-Based Full Disk Encryption Secure against Main Memory Attacks," ACNS 2012, Jun. 26, 2012, pp. 66-83.
Myers D.S et al., "Intercepting Arbitrary Functions on Windows, UNIX, and Macintosh OS X Platforms," CS-TR-4585, UMIACS-TR-2004-28, Jan. 2004, 9 pages.
Popek G.J., et al., "Formal Requirement for Virtualizable Third Generation Architectures," Communications ofthe AMC, Jul. 1974, vol. 17 (7), pp. 412-421.
Saboonchi N., "Hardware Security Module Performance Optimization by Using a "Key Pool"," XP055487989, Dec. 25, 2014, Retrieved from the Internet: https://people.kth.se/~maguire/DEGREE-PROJECT-REPORTS/141225-Nima_Saboonchi-with-cover.pdf [retrieved on Jun. 26, 2018], 71 pages.
Search Report for European Application No. EP18174202 dated Jul. 10, 2018, 11 pages.
VMWARE. Inc, "vSphere Storage—Update 1," Modified Jul. 12, 2018, VMware vSphere 6.0, VMware ESXi 6.0, vCenter Server 6.0, 315 pages.
Zhang F., et al., "CloudVisor: Retrofitting Protection of Virtual Machines in Multi-tenant Cloud with Nested Virtualization," SOSP'11, Oct. 23, 2011, pp. 203-216.

(56) References Cited

OTHER PUBLICATIONS

Communication pursuant to Article 94(3) EPC for European Application No. 19711103.2, dated Jul. 5, 2022, 7 pages.

\* cited by examiner

FIGURE 6

| Timestamp | IP src | Port src | IP dst | Port dst | Proto | AppProto |
|---|---|---|---|---|---|---|
| 15:30:05 | 154.250.0.45 | 9945 | 8.8.X.X | 53 | 6 | X |

FIGURE 7

| Timestamp | IP src | Port src | IP dst | Port dst | Proto | AppProto |
|---|---|---|---|---|---|---|
| 15:30:05 | 154.250.0.45 | 9945 | 8.8.X.X | X | 6 | X |

FIGURE 8

| Timestamp | IP src | Port src | IP dst | Port dst | Proto | AppProto |
|---|---|---|---|---|---|---|
| 15:30:05 | X.X.X.X | 9945 | X.X.X.X | X | 6 | X |

DATA MESSAGE SHARING

PRIORITY CLAIM

The present application is a National Phase entry of PCT Application No. PCT/EP2019/056886, filed Mar. 19, 2019, which claims priority from EP Patent Application No. 18169177.5, filed Apr. 25, 2018, each of which is hereby fully incorporated herein by reference.

TECHNICAL FIELD

The present disclosure relates to methods of sharing data messages containing sensitive data.

BACKGROUND

In IT security, Security Information and Event Management (SIEM) systems generate security data concerning threats, vulnerabilities, attacks and the like. SIEM systems generate SIEM data including, for example, network and system log files on which basis security analysis to identify, assess, monitor and respond to threats is undertaken for a computer system. It is increasingly desirable for multiple systems to share SIEM data to provide greater scope of insight of security-related data. For example, a first system may share SIEM data with a second system where the second system provides a SIEM data analysis service that may, for example, identify high-risk threats and opportunities for mitigation.

Challenges arise when sharing SIEM data between computer systems where the systems do not enjoy a trusted relationship because the nature of SIEM data is such that it can include highly sensitive information including names, e-mail addresses, IP addresses, identification of software and/or services executing in a system and the like. The sensitivity of such information is especially acute in view of the EU General Data Protection Regulation (GDPR) which imposes strict controls on the receipt, storage, use and distribution of personal information. The challenge is emphasized where multiple systems communicate and the degree of trust between pairs of systems differs such that data that is anonymized for one system need not be anonymized for another.

SUMMARY

Accordingly, it would be beneficial to provide for the benefits of effective sharing of SIEM data while assuring the security of sensitive data.

The present disclosure accordingly provides, in a first aspect, a computer implemented method of sharing a data message containing multiple data fields between a provider computer system and a consumer computer system, wherein the provider and consumer computer systems have mutual mistrust, the method comprising: responsive to an authentication of the provider computer system, receiving a definition of one or more fields in the data message accessible to the consumer computer system, each field having associated a cryptographic key; responsive to an indication from a data storage server that a ciphertext of the data message is requested to be stored in the data storage server including a derivative of an identifier of the provider computer system, confirming the authenticity of the ciphertext by confirming the authenticity of the derivative, wherein each field of the ciphertext is encrypted using a corresponding cryptographic key; responsive to an authentication of the consumer computer system, issuing the consumer computer system with a cryptographic key for each of the fields in the data message accessible to the consumer computer system, such that the consumer computer system is operable to obtain the ciphertext from the data storage server and to decrypt the one or more accessible data fields and such that other data fields being non-accessible to the consumer are encrypted to anonymize such other data fields.

In some embodiments, the derivative of the identifier of the provider computer system is a hash or digest of an identifier of the provider.

In some embodiments, communication with each of the provider and consumer computer systems is encrypted using separate session keys.

In some embodiments, the operation responsive to the authentication of the consumer further comprises communicating a derivative of the data message to the consumer computer system such that the consumer computer system can identify the data message to the data storage server for retrieval thereof.

In some embodiments, the derivative of the data message is a hash or digest of the data message.

In some embodiments, at least some of the data fields in the data message are unencrypted.

The present disclosure accordingly provides, in a second aspect, a computer system including a processor and memory storing computer program code for performing the method set out above.

The present disclosure accordingly provides, in a third aspect, a computer program element comprising computer program code to, when loaded into a computer system and executed thereon, cause the computer to perform the method set out above.

BRIEF DESCRIPTION OF THE DRAWINGS

Embodiments of the present disclosure will now be described, by way of example only, with reference to the accompanying drawings, in which:

FIGS. 6, 7 and 8 illustrate exemplary anonymized data messages for consumers in an exemplary embodiment of the present disclosure.

DETAILED DESCRIPTION

Embodiments of the present disclosure include a communication protocol and key derivation function for encrypting selective parts of STEM data records using an onion-skin encryption methodology (e.g. nested encrypted elements utilizing multiple keys) for anonymizing parts of the encryption. Keys can be distributed to receiving systems via a novel protocol which uses trusted intermediaries to provide features of: assurance that messages are genuine; protection of sender identity; and assurance of anonymity of a message payload. In this way, STEM data containing sensitive information can be selectively anonymized in a targeted manner (such as by receiver) and communicated reliably to receiver systems without compromising the sensitive information.

Figure 1:
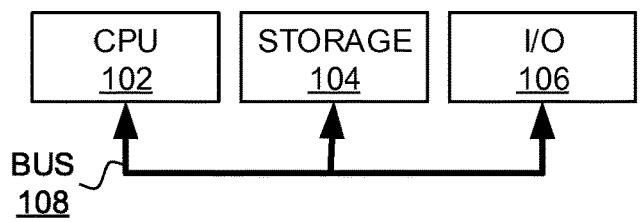
FIG. 1 is a block diagram a computer system suitable for the operation of embodiments of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2A:
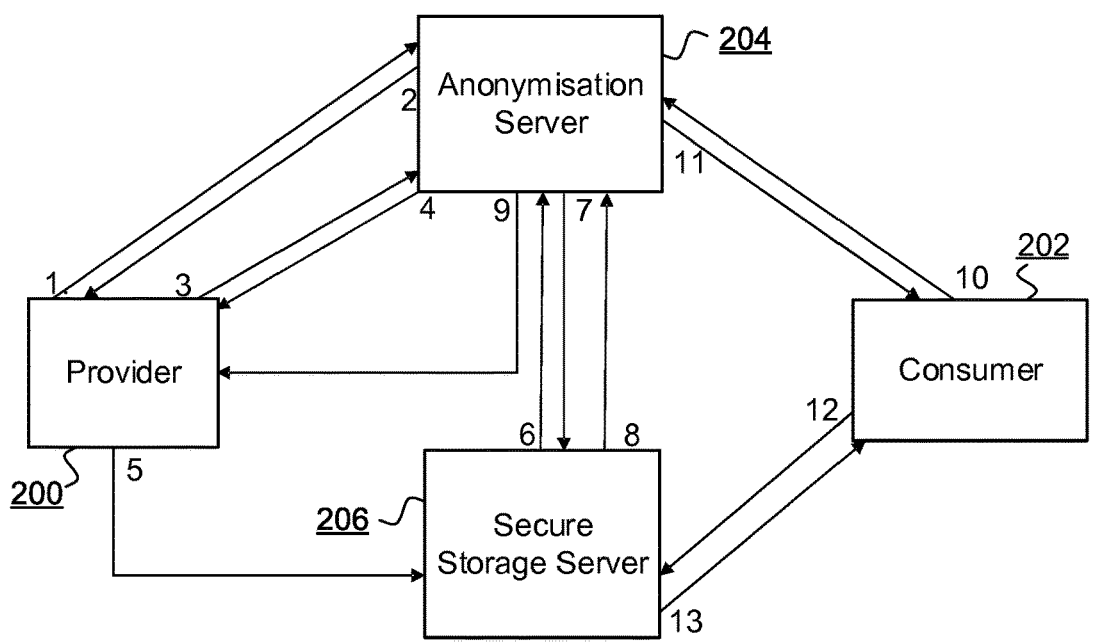
FIG. 2a is a conceptual illustration of communications between entities in accordance with embodiments of the present disclosure.

FIG. 2a is a conceptual illustration of communications between entities in accordance with embodiments of the present disclosure. A provider computer system 200 is a physical, virtualized or component of a computer system configured to provide data messages such as STEM data records for sharing with potentially untrusted other computer systems. The data messages contain multiple data fields, at least some of which include sensitive information that requires anonymization, such as personal information, identification information or the like. The data messages are provided for receipt by a consumer computer system 202, and a determination of whether a data field requires anonymization depends on the consumer computer system 202 such that, for example, a level of trust of the consumer 202 is used to determine if a data field in the message is to be anonymized. Anonymization of a data field includes obfuscating data stored in the data field such that original data stored in the data field cannot be discerned.

An anonymization server 204 is provided has a hardware, software, firmware, physical or wholly or partly virtualized component for providing sharing of data between the provider 200 and the consumer 202. The anonymization server 204 is trusted by each of the provider 200 and the consumer 202 though there is mutual mistrust between the consumer 202 and the provider 200. The anonymization server provides authentication of each of the provider 200 and the consumer 202 and implements a data sharing agreement (DSA) on behalf of the provider 200.

A DSA is determined based on a definition of one or more fields in the data message of the provider 200 accessible to the consumer 202. The DSA can be realized by, for example, a cryptographic key such as a symmetric key for each of one or more fields in the data message such that access to the fields by the consumer 202 can be controlled by provision of selected keys dependent on the determined accessible fields. Thus, fields in the data message can be encrypted using the keys as a mechanism for anonymizing the data and access to the data can be controlled by controlling access to the keys.

Notably, the anonymization server 204 does not store the data message having fields encrypted by the provider 200. Rather, a secure storage server 206 is provided, the storage server 206 storing data messages (including their encrypted data fields) while having no access to keys required for access thereto. Thus, the secure storage server 206 maintains no relationship with the provider 200 or the consumer 202. Most preferably, the provider 200 and the consumer 202 also do not identify themselves to the secure storage server 206 such that the secure storage server 206 is unable to monitor or track entities storing and/or accessing data therein. For example, the provider 200 can communicate a derivative of its identifier (such as a hash or digest of an identifier of the provider 200) to the storage server 206 as an anonymized identification of the provider 200. The storage server 206 is adapted to confirm an authenticity of data messages requested for storage therein by confirming such derivative of an identity of the provider 200 is verifiable by the anonymization server 204. In this way, there is no coupling between the provider 200, the consumer 202 and the storage server 206.

Thus, in use, the provider 200 authenticates with the anonymization server 204 and defines a DSA for storage therein. The provider 200 further requests storage of a data message including one or more encrypted data fields in the storage server 206, which authenticates the provider 200 by a derivative of an identifier of the provider 200 with reference to the anonymization server 204. Subsequently, the consumer 202 can request (or be informed of) information on data message(s) available for it at the secure storage server 206 by authenticating with the anonymization server 204. The anonymization server 204 can identify individual messages by a derivative thereof, such as a digest or hash provided by the provider 200. The anonymization server 204 further issues the consumer 202 with cryptographic keys for access to authorized fields in a data message in accordance with the DSA. Subsequently, the authenticated consumer 202 requests a data message from the storage server 206 based on the derivative of the message (such as a hash or digest) provided by the anonymization server 204.

In this way, there need be no trust between the consumer 202 and the provider 200 and the secure storage server 206 need have no knowledge of either entity. The mutually trusted anonymization server 204 provides for the enforcement of granular access control to data fields of the data message based on the DSA provided by the provider 200 and using cryptographic keys to control field access by the consumer 202. Thus, data messages including sensitive information can be shared between providers and consumers without compromising the security of the sensitive information.

Figure 2B:
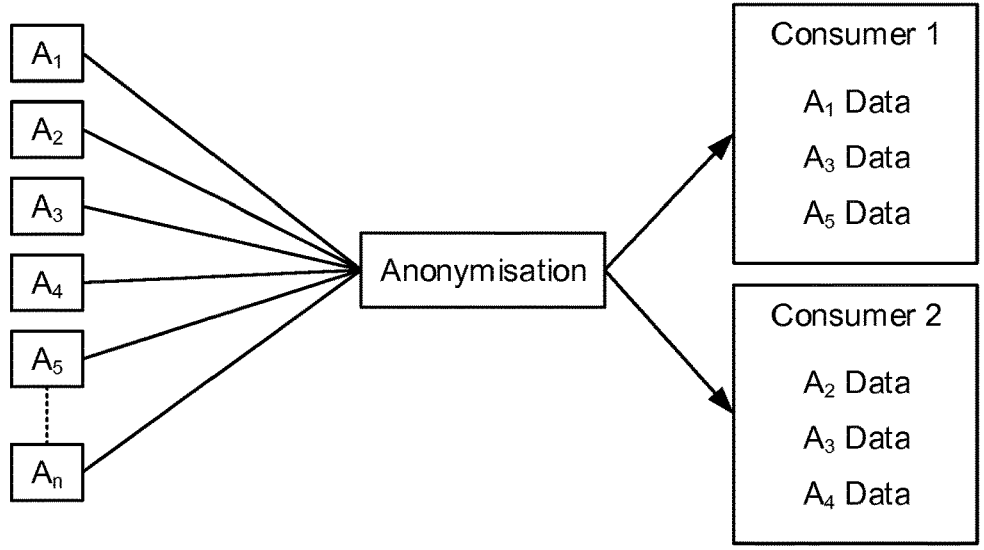
FIG. 2b is a conceptual illustration of data message providers and consumers arranged for sharing data messages in accordance with embodiments of the present disclosure.

FIG. 2b is a conceptual illustration of data message providers and consumers arranged for sharing data messages in accordance with embodiments of the present disclosure. Potentially multiple providers $A_1$ to $A_n$ are willing to provide data messages. The data messages are anonymized in such a way the anonymization process is bound to a consumer according the provider specification in a DSA. For example, in the arrangement of FIG. 2b there is a list of potential senders A and two different consumers, such as two different third party data analysis services for the analysis of computer network security data. Consumer 1 wishes to perform a collaborative analysis by using the data of providers $A_1$, $A_3$ and $A_5$. Consumer 2 uses the data of providers $A_2$, $A_3$ and $A_4$.

Figure 3:
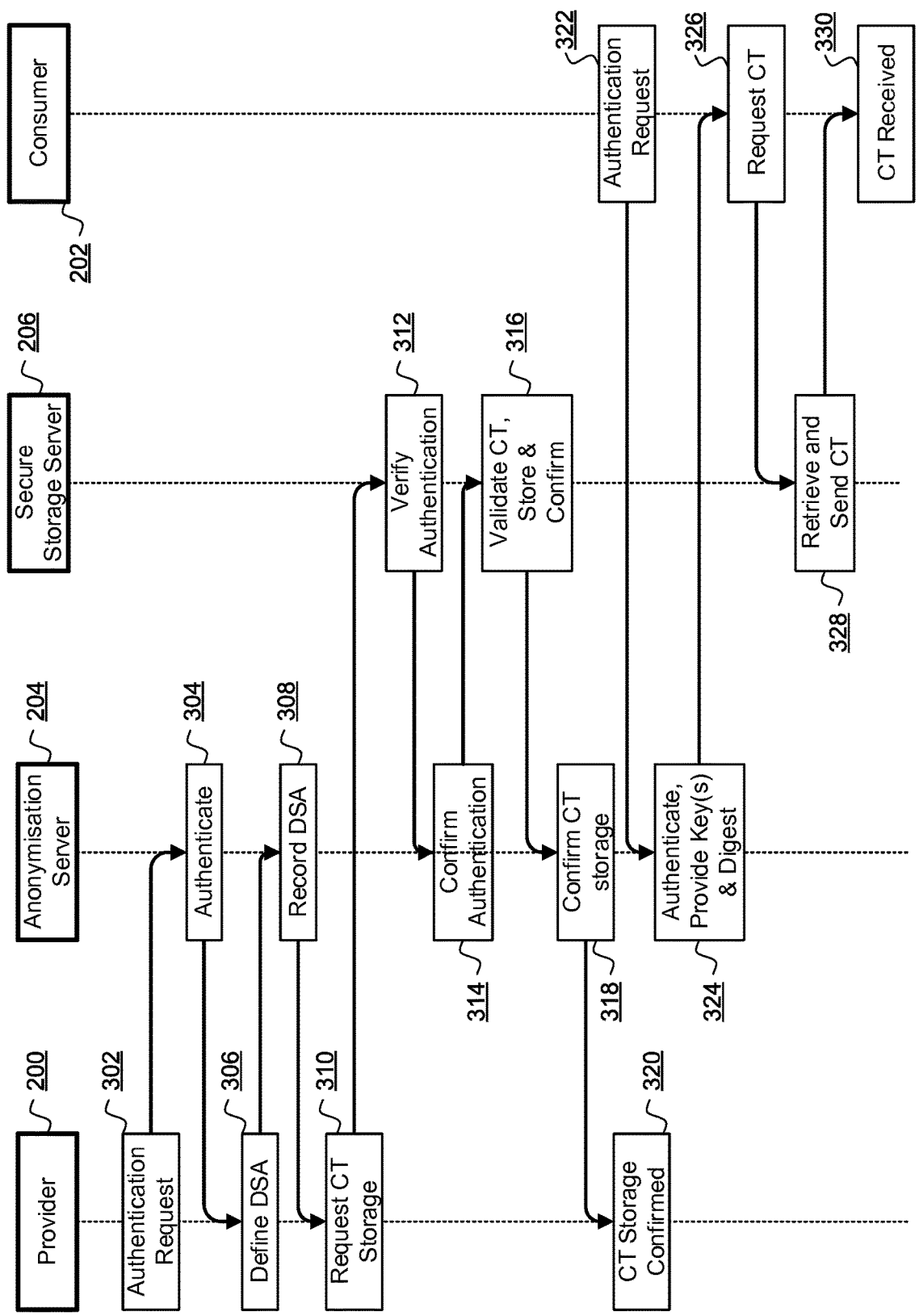
FIG. 3 is a flowchart of a method of sharing a data message between a provider and consumer in accordance with embodiments of the present disclosure.

FIG. 3 is a flowchart of a method of sharing a data message between a provider 200 and consumer 202 in accordance with embodiments of the present disclosure. The method is meant for the secure exchange of a certain data message from a provider 200 to a consumer 202. The method provides:

The provider's identity is preserved/hidden from the consumer by using, for example, an authenticated cryptographic hash digest using two further entities—the anonymization server 204 and the secure storage server 206—acting as guarantor and repository respectively.

The consumer is assured that a data message is genuine, truly valuable, and sent by an authenticated provider.

Privacy of the data message is strongly held (even if the secure storage server 206 is compromised, attacked or leaked) due to the particular method of embodiments of the present disclosure. In particular:

The anonymization server 204 is trusted with knowledge of the provider 200 and consumer 202 identity and encryption key(s) but not the data messages themselves.

The secure storage server 206 will store the data messages with fields encrypted by the provider 200 according to a defined DSA. The storage server 206 does not have knowledge of the encryption keys required to access encrypted data fields.

Consumers will receive encryption keys for authorized data fields in data messages according to the DSA. The identity of a provider 200 of a data message may not be available to a consumer 202.

The method of FIG. 3 will now be described for the storage and retrieval of a data message in accordance with embodiments of the present disclosure. Initially, at 302, the provider 200 authenticates with the anonymization server 204 at 304. At 306 the provider 200 defines a DSA for recordal and enforcement by the anonymization server 204 at 308. At 310 the provider 200 requests storage of a ciphertext (CT) of the data message at the secure storage server 206. The ciphertext is the data message encrypted according to the DSA such that one or more encryption keys are utilized to encrypt each of one or more (including potentially a subset) of fields of the data message. At 312, the storage server 206 first authenticates the request from the provider 200. The provider 200 communicates a derivative of an identifier of the provider 200 to the storage server 206 which the storage server uses to authenticate the provider 200 by the anonymization server 204 at 314. At 316 the storage server 206 validates the ciphertext, stores and confirms to the anonymization server 204, sending some derivative (e.g. a hash or digest) of the ciphertext to the anonymization server 204. The Anonymization server 204 records the derivative of the ciphertext at 318 and confirms ciphertext storage to the provider 200 at 320. At 322 the consumer 202 authenticates with the anonymization server 204 which then provides cryptographic keys to the consumer 202 according to the DSA of the provider 200 at 324. The anonymization server 204 also sends a digest (or other derivative) of any data messages stored in the storage server 206 by the provider 200 accessible to the consumer 202 according to the DSA. At 326 the consumer requests the ciphertext of the data message from the storage server 206 based on the digest (or other derivative) provided by the anonymization server. The storage server 206 retrieves and sends the ciphertext at 206 for receipt by the consumer 202 at 330.

Considering the method of FIG. 3 in more detail, the method of FIG. 3 will be further described in terms of the operations indicated by the arrowed lines between the entities of FIG. 2a. Taking each in turn:

1. The provider 200 sends a message encrypted with a certified public key of the anonymization server (doing so, the confidentiality over the message is held and also "Man In The Middle attacks" are countered). The message contains the identifier of the provider, its password, a nonce to provide freshness and prevent replay attacks, and a new fresh symmetric key (session$K_A$) generated by the provider 200 (a session key) and its lifetime (lifetime$_{sessionKa}$) which essentially can be a timestamp of the key, when the key has been generated, and how long will it be valid.

2. The anonymization server 204, receiving message 1, authenticates the provider 200 and replies with an acknowledge message, encrypted with the symmetric (secret) session key that the provider 200 sent in message 1 (session$K_A$). The reply message payload is a digital signature (the hash digest encrypted with the private key) over the whole message 1.

3. The provider 200 sends a message to the anonymization server 204 containing: an identifier of the provider 200, a new nonce, the data sharing agreement (DSA), the hashed value or digest of a cipher-text of a data message, $H(C)^J$ the J superscript means the might be more than one), a secret (symmetric) master key (s$K_{master}$, used to encrypt/anonymize the data message) and its lifetime. This time the message is encrypted using the session key of the provider 200.

4. The anonymization server 204 acknowledges message 3 with the same message structured used for message 2.

5. The provider 200 sends a submission-request message to the secure storage server 206 encrypted using a certified public key of the storage server 206. The submission-request message contains the hash digest of an identity of the provider 200 ($H(ID_A)$, in doing so the provider 200 will not reveal its identity to the storage server 206 and will remain anonymous. Preferably, the storage server 206 is stateless and does not keep track of entity activity), the identifier of the storage server ($ID_{TTP}$), the cipher-text ($C^J$, the data message encrypted using the master secret key, the J superscript means there might be more than one) and the lifetime associated to the cipher-text.

6. When the storage server 206 receives a submission-request message (any occurrence of message 5), a 'submission event' is triggered. The storage server 206 sends a message to the anonymization server 204 containing an identifier of the storage server 206, an identifier of the anonymization server 204 and the hash digest of the provider's identity. The message is encrypted by using a strong symmetric key shared between the storage server 206 and the anonymization server 204 (s$K_{TTP\_S}$, long term key). This message represents a 'challenge request' to validate the message previously received by the storage server 206 from the provider 200 (it might be thought of as a message from the storage server 206 to the anonymization server 204 asking "I don't know this consumer $H(ID_A)$, can I trust it? Is it allowed to submit?").

7. The anonymization server 204, receiving the challenge-request message from the storage server, performs a look-up operation in its database based on the hash digest of the provider 200 provided by the storage server. A match of the provider 200 will be found and the anonymization server 204 will respond to the storage server 206 with a challenge-response message containing the hash digest of the cipher-text of the data message of the provider 200 plus the identifiers of the synchronization server 204 and the storage server 206. This message is again encrypted by using the shared secret key between the storage server 206 and the anonymization server 204 (s$K_{TTP\_S}$, long term key).

8. The storage server 206, receiving the challenge-response message from the provider 200, performs a validation test: it computes the hash digest over the cipher-text received at message 5 and compares with the one received from the provider 200, if they match then the cypher-text is securely stored and an acknowledge message is sent back to the anonymization server 204. The provider 200 has been successfully authenticated without revealing its identity to the storage server 206.

9. The anonymization server 204, receiving the acknowledge message from the storage server 206, sends an acknowledge message to the provider 200 to confirm that the cipher-text of the data message was successfully submitted, stored and is available from the storage server 206. The message contains the identifiers of the provider 200 and the anonymization server 204 plus the digital signature of the cipher-text submitted.

10. The consumer 202 periodically checks with the anonymization server 204 if there is any message available. First the consumer 202 authenticates itself with the anonymization server 204, sending a message encrypted with the certified public key of the anonymization server 204 containing the consumer's 202 identifier, the consumer's 202 password, a new nonce and a new fresh secret session key generated by the consumer 202 with an associated lifetime (as for the provider 200 at message 1).

11. The anonymization server 204, receiving the message from the consumer 202, first authenticates the consumer 202, then if any message for the consumer 202 is found in the DSA sends the hash digests $H(C)^J$ of the cipher-text messages to the consumer 202 and the sub-keys $K_i^J$ for opening the message components the consumer 202 is permitted to access. The message is encrypted by using the session key that the consumer 202 generated and sent in message 10.

12. The consumer 202 sends a retrieving-request message to the storage server 206 in order to obtain the cipher-text of the data message. The request contains the hash digests that the consumer 202 received from the anonymization server 204 in message 11 and a session secret key with associated lifetime.

13. The storage server 206, receiving the retrieving-request message from the consumer 202, performs a look-up operation over $H(C)^J$ and, if matches are found, the storage server 206 a retrieving-response message to the consumer 202 with the cipher-text. The message is encrypted using the secret session key that the consumer 202 sent in message 12. At this point the protocol execution is completed.

Figure 4:
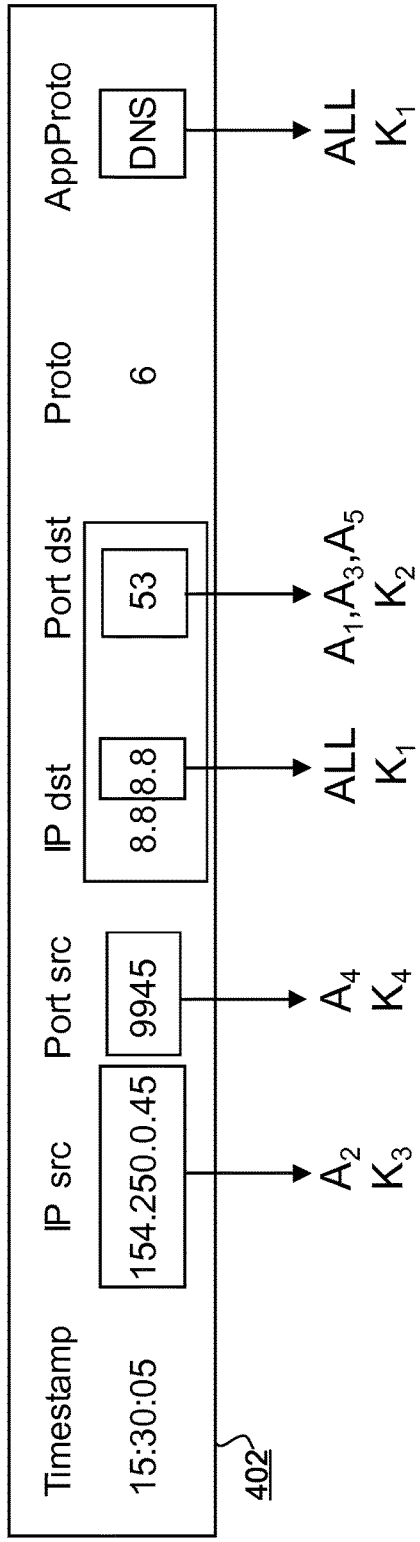
FIG. 4 illustrates an exemplary data message having multiple data fields in an embodiment of the present disclosure.

FIG. 4 illustrates an exemplary data message 402 having multiple data fields in an embodiment of the present disclosure. In one embodiment, the message is provided for a user, operator or other entity of the provider 200 to define fields of the data message and which entities ($A_1$ through $A_n$ in FIG. 2b, which may be providers, consumers or both) should be permitted access to which fields. Accordingly, fields are identified (such as sensitive or protected data fields in the message) and consumers authorized to access those fields are defined. Notably, the data message 402 of FIG. 4 could alternatively be a template, schema, model or data structure for a data message such that data fields are identified in such a structure.

Each data field identified for anonymization and protection against access except by authorized consumers are associated with a cryptographic key protecting the field. FIG. 4 indicates which fields are to be anonymized (i.e. access precluded) for which consumers. Thus, in FIG. 4, the "IP src" field is to be anonymized only for consumer $A_2$ and is protected by encryption using key $K_3$. The field "Port src" is to be anonymized only for consumer $A_4$ and is protected by encryption using key $K_4$. The rightmost two bytes of the field "IP dst" are to be anonymized for all consumers ("ALL") and are protected by encrypted using key $K_1$. The "Port dst" field is to be anonymized for consumers $A_1$, $A_3$ and $A_5$ and is protected by encryption using key $K_2$. The "AppProto" field is anonymized for all consumers and is protected by encryption with key $K_1$.

Thus, it is possible to specify which parts of a data message are to be anonymized, what to anonymize and for who. The encryption of data fields that may be nested can use a multi-layer encryption technique by in applying encryption several times to a data field, first at one original layer, then upon another layer and so on, defining a hierarchy, using different keys for different components and layers.

Figure 5:
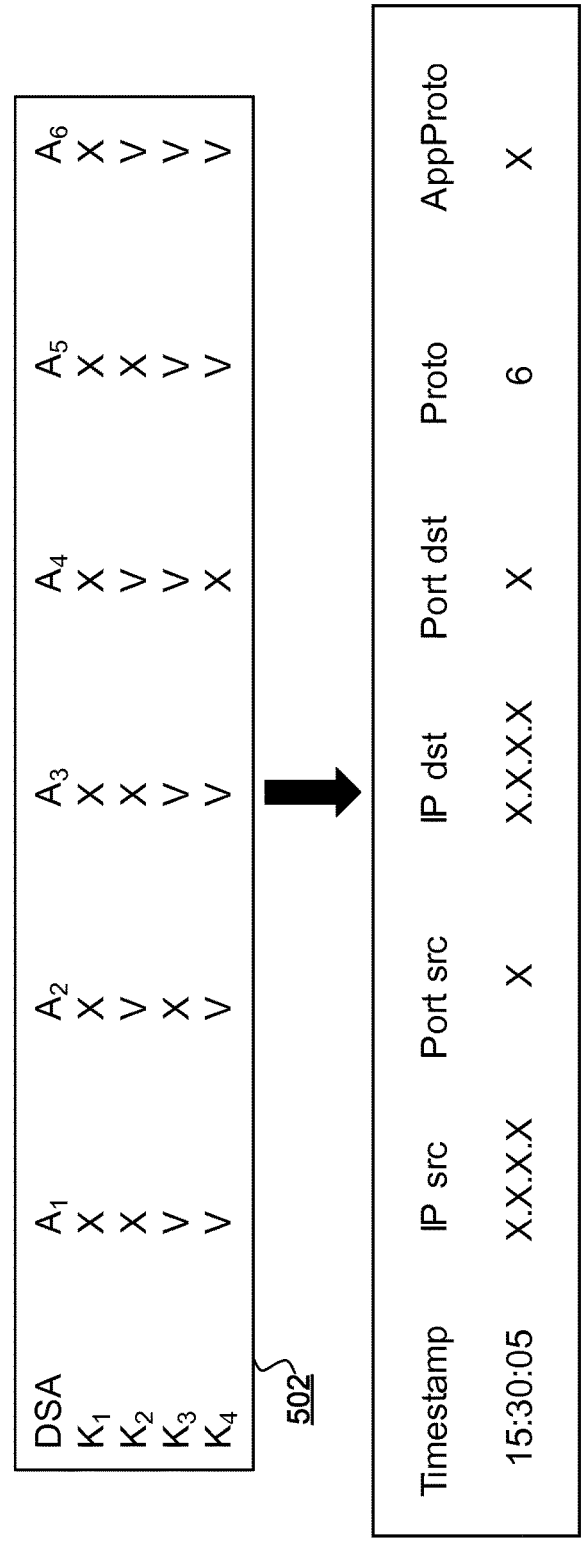
FIG. 5 illustrates an exemplary data sharing agreement (DSA) for consumers embodiments of the present disclosure.

FIG. 5 illustrates an exemplary data sharing agreement (DSA) for consumers according to embodiments of the present disclosure. Keys for data fields can be generated using a Key Derivation Function (KDF) algorithm starting from a primary master key (e.g. $sK_{master}$) to define the DSA. For example, a policy rule can be defined in which the last two bytes of the destination IP address (IP dst) and the application protocol (AppProto) are hidden for all consumers. This operation instantiates the first sub-key ($K_1$) and an entry is added in a DSA which includes a key table 502. In the key table 502, all consumers (in this example $A_1$-$A_6$) are marked with an 'X' meaning that $K_1$ will not be issued to them. Further, the destination port field (Port dst) is anonymized only for consumers $A_1$, $A_3$, $A_5$ and a new key, $K_2$, is instantiated and an entry is added in the key table 502, creating a second layer, where a 'V' indicates consumers for which the key $K_2$ will be made available (i.e. only consumers $A_2$, $A_4$ and $A_6$ will be permitted access to $K_2$ and, thus, the "Port dst" field). Once the DSA is finalized, data messages are anonymized as illustrated by way of example at the bottom of FIG. 5.

FIGS. 6, 7 and 8 illustrate exemplary anonymized data messages for consumers in an exemplary embodiment of the present disclosure. FIG. 6 illustrates an exemplary data message for a consumer $A_6$ according to the DSA of FIG. 5. Thus, the DSA defines $A_6$ as having access to keys $K_2$, $K_3$ and $K_4$ so permitting access to data fields "Port dst", "IP src" and "Port src".

FIG. 7 illustrates an exemplary data message for consumers $A_1$, $A_3$ and $A_5$ according to the DSA of FIG. 5. Thus, the DSA defines $A_1$, $A_3$ and $A_5$ as having access to keys $K_3$ and $K_4$ so permitting access to data fields "IP src" and "Port src".

FIG. 8 illustrates an exemplary data message for a consumer $A_2$ according to the DSA of FIG. 5. Thus, the DSA defines $A_2$ as having access to keys $K_2$ and $K_4$ so permitting access to data fields "Port src" and "Port dst".

Notably, in a multi-layered encryption scheme, multiple keys may be required to access a data field, such as nested fields with each level of nesting being encrypted by using different keys. In such arrangements, while a consumer may have access to a key for a nested field, if it does not also have access to a key for a nesting field then it may not be possible to decrypt the nested field.

Figure 9:
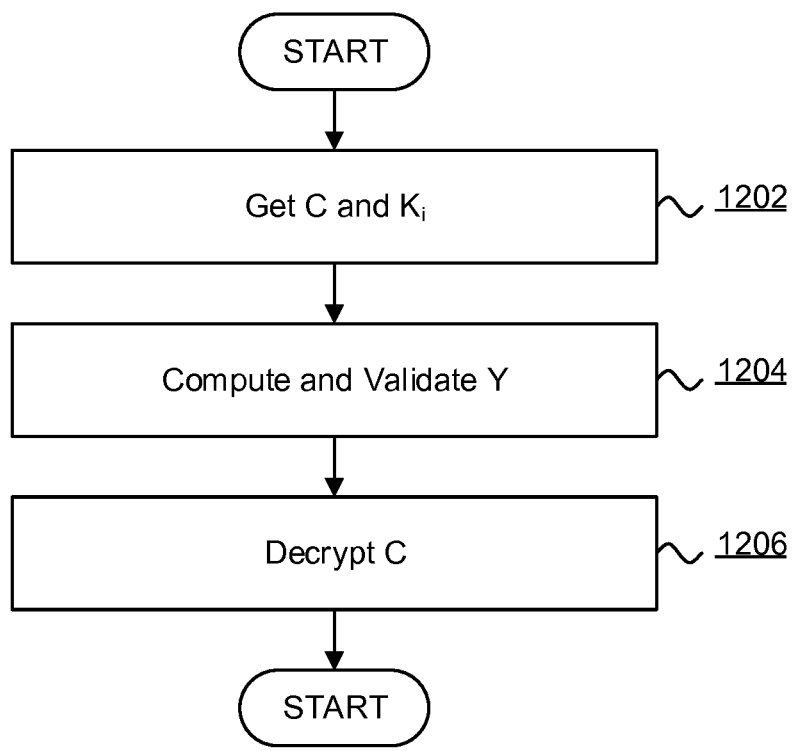
FIG. 9 is a flowchart of a method of accessing a data message in accordance with embodiments of the present disclosure.

FIG. 9 is a flowchart of a method of accessing a data message in accordance with embodiments of the present disclosure. An anti-collusion mechanism is preferred because consumers may cooperate to access more data fields than as a collective. Such a mechanism is summarized as:

A consumer 202 enters an anonymized message as a cipher-text along with respective keys (1202);

Software executed by the consumer 202 validates the consumer 202 by computing a special token, referred as 'validation token', as the hash value obtained by the concatenation of the consumer's identifier, a registered MAC address, a register IP subnet and the sub keys entitled to that consumer 202 (1204);

The software sends the computed validation token to the anonymization server 204 as a 'challenge-response' request. If the anonymization server 204 finds a match with its stored validation token, then the consumer 202 is permitted to run the decryption process (1206);

Once the anonymized data message is decrypted, then opened, it will be available only within the software executed by the consumer 202 meaning that it will not be possible to paste and copy it, neither to print it or forward it via e-mail.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the invention is not limited thereto and that there are many possible variations and modifications which fall within the scope of the invention. The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method of sharing a data message containing multiple data fields between a provider computer system and a consumer computer system, wherein the provider computer system and the consumer computer system have mutual mistrust, the method comprising:

responsive to an authentication of the provider computer system by an anonymization server trusted by the provider computer system and the consumer computer system, receiving, by the anonymization server, from the provider computer system, a definition of one or more fields in the data message accessible to the consumer computer system, each field having associated a cryptographic key wherein the cryptographic keys of one or more fields are different from one another;

responsive to an indication from a data storage server that a ciphertext of the data message is requested by the provider computer system to be stored in the data storage server including a derivative of an identifier of the provider computer system, confirming, by the anonymization server, an authenticity of the ciphertext by confirming an authenticity of the derivative of the identifier of the provider computer system, wherein each field of the ciphertext is encrypted using a corresponding cryptographic key; and responsive to an authentication of the consumer computer system, issuing, by the anonymization server, the consumer computer system with a cryptographic key for each of the fields in the data message accessible to the consumer computer system, such that the consumer computer system is operable to obtain the ciphertext from the data storage server and to decrypt the one or more accessible data fields and such that other data fields being non-accessible to the consumer are encrypted to anonymize the other data fields, and communicating a derivative of the data message to the consumer computer system such that the consumer computer system can identify the data message to the data storage server for retrieval of the data message.

2. The method of claim 1, wherein the derivative of the identifier of the provider computer system is a hash or digest of an identifier of the provider computer system.

3. The method of claim 1, wherein communication with each of the provider computer system and the consumer computer system is encrypted using separate session keys.

4. The method of claim 1, wherein the derivative of the data message is a hash or a digest of the data message.

5. The method of claim 1, wherein at least some of the data fields in the data message are unencrypted.

6. A non-transitory computer-readable storage medium storing a computer program element comprising computer program code to, when loaded into a computer system and executed thereon, cause the computer system to perform the method as claimed in claim 1.

7. A computer system comprising:

a processor and memory storing computer program code for sharing a data message containing multiple data fields between a provider computer system and a consumer computer system, wherein the provider computer system and the consumer computer system have mutual mistrust, by:

responsive to an authentication of the provider computer system by an anonymization server trusted by the provider computer system and the consumer computer system, receiving, by the anonymization server, from the provider computer system, a definition of one or more fields in the data message accessible to the consumer computer system, each field having associated a cryptographic key wherein the cryptographic keys of one or more fields are different from one another;

responsive to an indication from a data storage server that a ciphertext of the data message is requested by the provider computer system to be stored in the data storage server including a derivative of an identifier of the provider computer system, confirming an authenticity of the ciphertext by confirming, by the anonymization server, an authenticity of the derivative of the identifier of the provider computer system, wherein each field of the ciphertext is encrypted using a corresponding cryptographic key; and responsive to an authentication of the consumer computer system, issuing, by the anonymization server, the consumer computer system with a cryptographic key for each of the fields in the data message accessible to the consumer computer system, such that the consumer computer system is operable to obtain the ciphertext from the data storage server and to decrypt the one or more accessible data fields and such that other data fields being non-accessible to the consumer are encrypted to anonymize the other data fields, and communicating a derivative of the data message to the consumer computer system such that the consumer computer system can identify the data message to the data storage server for retrieval of the data message.

* * * * *